UNITED STATES PATENT OFFICE.

KARL F. M. SCHAERGES, DECEASED, LATE OF BASEL, SWITZERLAND, BY MAGDALENA SCHAERGES, IN TRUST FOR HERSELF AND THE HEIRS OF SAID KARL F. M. SCHAERGES, DECEASED, ASSIGNOR TO HOFFMANN-LA ROCHE CHEMICAL WORKS, OF NEW YORK, N. Y., A CORPORATION OF NEW YORK.

PREPARATION OF OPIUM ALKALOIDS.

1,056,219.  Specification of Letters Patent. Patented Mar. 18, 1913.

No Drawing.  Application filed December 16, 1909. Serial No. 533,495.

*To all whom it may concern:*

Be it known that I, MAGDALENA SCHAERGES, née HARI, a subject of the German Emperor, residing at Basel, Switzerland, am the heiress and administratrix of the estate of KARL FRIEDRICH MARIA SCHAERGES, deceased, late a subject of the German Emperor, residing at Basel, Switzerland, who invented a certain new and useful Preparation of Opium Alkaloids, of which the following is a specification.

Opium is the most generally known hypnotic, sedative and anodyne, and morphin is generally considered the most active constituent of opium and its preparations. It is known also, that the effect of opium is stronger, than that corresponding to the quantity of morphin contained in it, because the accompanying alkaloids assist in its physiological effect. Consequently pure morphin cannot completely replace opium as regards its effect; the latter has moreover the advantage, that many patients find less inconvenience in its use and that it decidedly surpasses morphin as regards its action on the intestine. The total quantity of alkaloids contained in commercial opium is usually from 18 to 20 per cent., the moisture about 20 per cent. and consequently the inert matter about 60 per cent. The major part of this inert matter passes into the galenic preparations hitherto known and has the effect, that the latter will not keep well, cannot be sterilized and are therefore useless for subcutaneous application.

According to the present invention, however, products may be obtained, which contain the whole of the alkaloids, of opium as pure as possible, which are moreover soluble in water, sterilizable and what is specially important, suitable for subcutaneous injections.

The new pharmaceutical preparations exhibit the complete and undiluted action of opium, and possess the great advantage, that their field of application is practically unlimited.

The new opium preparation may, for instance, be made as follows:—500 grams of opium are reduced to small particles and macerated with two liters of one per cent. hydrochloric acid for 24 hours. The acid extract is then separated as well as possible and the extraction with one per cent. hydrochloric acid is repeated. The united extracts are treated with a sodium carbonate solution, thereby precipitating the majority of the alkaloids. In order to obtain the bases remaining in solution, the solution is shaken with organic solvents, such as ether, chloroform and benzene, until even the most sensitive reagents for alkaloids no longer show any positive reaction in the aqueous solution. Subsequently the organic solvents are relieved of alkaloids by shaking them with hydrochloric acid, thereby obtaining an acid solution of alkaloids (A).

The precipitate produced with soda solution consists substantially of alkaloids, but contains also resins, which are removed by the following purifying process: The precipitate is mixed with asbestos-flakes, wood-shavings or similar materials and an extraction is made with alcohol of 95 per cent. in a Soxhlet apparatus. This treatment causes all the alkaloids to enter into solution, while the impurities remain in the residue. After distilling off the alcohol the remaining alkaloids are dissolved in the acid alkaloid solution A mentioned above, and finally the solution is concentrated to dryness *in vacuo*.

The preparation resulting from the above process is a yellowish crystalline powder, easily soluble in water to a clear liquid, which on calcination leaves only traces of a residue and an aqueous solution produces on sensitive litmus paper only a faintly acid reaction. A solution of 0.1 gram of the preparation in 20 cubic centimeters of water yields on the addition of a few drops of ammonia immediately a precipitate of the subsidiary alkaloids of opium, while solutions of morphin in hydrochloric acid under the same conditions at first remain clear. With Froede's reagent the preparation yields an intense violet color. If an aqueous solution of the preparation is shaken with chloroform and the latter evaporated, the residue remaining after evaporation yields with concentrated sulfuric acid a greenish yellow color changing to reddish yellow, and with Froede's reagent an intense moss-green color. If an aqueous solution of the preparation is treated with an excess of ammonia to form a precipitate, the filtrate shaken with chloroform and the latter evaporated, the residue yields with Froede's reagent at the first moment a brownish-yellow color, which is rapidly followed by a muddy violet, after which the color changes to a muddy bluish-green, then to violet-brown and finally to violet, which is soon surrounded by a greenish-yellow ring. The preparation contains about 9 to 9.5 per cent. of water of crystallization, 9.8 to 10.2 per cent. of hydrochloric acid and 44–45 per cent. of anhydrous morphin.

In the above process the hydrochloric acid may be replaced by other acids, but the final products obtained do not offer any advantage in comparison with those obtained by means of hydrochloric acid.

What I claim is:—

1. A process of preparing opium alkaloids which comprises preparing an opium extract, separating alkaloids therefrom by precipitation, forming a solution of the alkaloids remaining after such separation, dissolving the precipitated alkaloids in said alkaloid solution, and concentrating such solution.

2. A process of preparing opium alkaloids which comprises preparing an opium extract, separating alkaloids therefrom by precipitation, forming a solution of the alkaloids precipitated together with those remaining in solution after said precipitation, and reducing the alkaloids contained in the solution thus produced into the form of a powder.

3. A process of preparing soluble opium alkaloids which comprises forming an acid aqueous opium extract, treating the same with an alkali to precipitate the alkaloids, separating the precipitate from the alkaline liquor, treating the alkaline liquor with a solvent to form a solution of the alkaloids remaining therein, removing the alkaloids from the resulting solution, purifying the precipitated alkaloids, dissolving the precipitated alkaloids in the solution of alkaloids, and concentrating the resulting solution.

4. The process for the manufacture of pharmaceutical preparations containing the whole of the alkaloids of opium in an easily soluble form suitable for subcutaneous injections, which consists in preparing an acid aqueous opium extract, forming a precipitate by means of an alkali, separating the precipitate from the alkaline mother liquor, shaking the latter with an organic solvent, depriving the solution of alkaloids by shaking it well with acids adapted to yield salts soluble in water, purifying the alkaloids precipitated by the alkali, dissolving them in the acid solution of alkaloids and concentrating the solution to dryness, substantially as described.

5. A pharmaceutical preparation in the form of a dry powder easily soluble in water and composed of the whole of the alkaloids of opium, water of crystallization, and hydrochloric acid.

6. A pharmaceutical preparation in the form of a yellowish crystalline powder easily soluble in water and containing all the subsidiary alkaloids of opium, said preparation yielding an intense violet color with Froede's reagent.

7. The product obtainable by the process described, being a yellowish crystalline powder, easily and clearly soluble in water, containing about 9 to 9.5 per cent. of water of crystallization, 9.8 to 10.2 per cent. of hydrochloric acid and 44 to 45 per cent. of anhydrous morphin, the said product producing on litmus paper a faintly acid reaction and leaving on calcination only traces of residue, a solution of 0.1 grams in 200 cubic centimeters of water yielding with a few drops of ammonia immediately a precipitate and with Froede's reagent an intense violet color, an aqueous solution, when shaken with chloroform and the latter evaporated, and the residue remaining after evaporation when treated with concentrated sulfuric acid yielding a greenish-yellow color changing to reddish yellow and yielding when treated with Froede's reagent an intense moss-green color.

In testimony whereof I have hereunto set my hand in presence of two subscribing witnesses.

MAGDALENA SCHAERGES,
*Administratrix of the estate of Karl F. M. Schaerges.*

Witnesses:
GEO. GIFFORD,
ARNOLD ZUBER.